United States Patent [19]

Kleeberg et al.

[11] Patent Number: 4,528,358
[45] Date of Patent: Jul. 9, 1985

[54] METHOD FOR THE MANUFACTURE OF EPOXY RESIN MOLDING MATERIALS

[75] Inventors: Wolfgang Kleeberg, Erlangen; Klaus-Robert Hauschildt; Heinz Hacker, both of Nuremberg; Klaus Kretzschmar, Erlangen, all of Fed. Rep. of Germany

[73] Assignee: Siemens Aktiengesellschaft, Berlin and Munich, Fed. Rep. of Germany

[21] Appl. No.: 635,423

[22] Filed: Jul. 30, 1984

[30] Foreign Application Priority Data

Jul. 29, 1983 [DE] Fed. Rep. of Germany ....... 3327712

[51] Int. Cl.³ ............................................. C08G 59/68
[52] U.S. Cl. ..................................... 528/94; 525/504; 528/93; 528/361; 528/408
[58] Field of Search ................... 525/504; 528/94, 361, 528/408, 93

[56] References Cited

U.S. PATENT DOCUMENTS 3,677,978 7/1972 Dowbenko et al. ............... 528/94 X
4,417,010 11/1983 Shimp ................................ 528/94 X Primary Examiner—Earl A. Nielsen
Attorney, Agent, or Firm—Kenyon & Kenyon

[57] ABSTRACT

Molding materials, laminates, stratified material and cover or protective layers which are of high electrical and mechanical quality are formed from polymerisable epoxy compounds if the corss-linking of the epoxy resins is accomplished by anionic polymerisation, using mixed catalysts of tertiary amines of the formula:

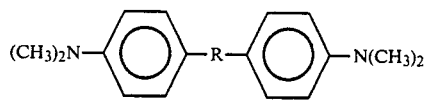

and an imidazoles of the formula:

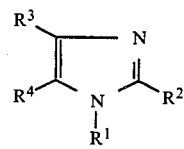

as a polymerisation catalysts.

16 Claims, No Drawings

METHOD FOR THE MANUFACTURE OF EPOXY RESIN MOLDING MATERIALS

BACKGROUND OF THE INVENTION

This invention relates to a method for the manufacture of hydrolysis-stable molding materials, laminates, stratified materials and covers or protective layers of anionically polymerisable di- or poly-epoxy compounds or mixtures of such compounds which are of high electrical and mechanical quality.

It is known that epoxy resins, especially glycidyl ether resins, can be polymerised with tertiary amines or boron trifluoride amine complexes to form molding materials. See in this connection, for instance, E. S. Narracott in "British Plastics", vol. 26, page 120 (1953), P. P. Kushch, B. A. Komarov and B. A. Rozenberg in "Polymer Science U.S.S.R.", vol. 21, Kushchpage 1867 (1979), P. P., B. A. Komarov and B. A. Rozenberg in "Polymer Science in U.S.S.R.", vol. 24, page 335 (1982) and M. Fedtke, M. Tarnow in "Plaste and Kautschuk", vol. 30, page 70 (1983) particularly page 70, paragraph 1. Preferred catalysts, for instance, for the polymerisation of aromatic diglycidyl ethers formed from bisphenol A and bisphenol F are Mannich bases of aromatic hydrocarbons or of phenols and heterocyclic compounds such as morpholine and its derivatives. These compounds result in cross-linked polymerisates which are formed in a few hours at temperatures around 100 degrees C. The molding materials so obtained are hydrolysis-stable, but the mechanical and thermal properties which are attainable by this method are inadequate for many applications. Typically, these compositions have a bending strength of less than 100 N/mm$^2$ and a vitrification transition range of 80 to 100 degrees C. With this kind of polymerisation, aliphatic unsaturated structure elements are produced which distinctly lower the thermal and oxidative stability of the molding materials.

It is further known that in the polymerisation of epoxy resins with tertiary aromatic amines, mechanically high-quality molding materials can be obtained. These processes suffer from the disadvantage of a low cross-linking rate. The combination of tertiary amines with Mannich bases surprisingly does not bring about an improvement. Rather, the level of the epoxy/Mannich base polymerisates is preserved. It is furthermore known that imidazole and derivatives thereof are capable of polymerising aromatic glycidyl ethers and glycidyl esters (see R. Dowbenko et al. in "Ind. Eng. Chem. Prod.", vol. 10, no. 3, page 344, 1971). However, the polymerisates formed in this process do not furnish usable molding materials.

On the other hand, molding materials obtained by anionic polymerisation of epoxy resins, as compared to molding materials of epoxy resins cross-linked by polyaddition, have the advantage of a better bond between the resin matrix and embedded fillers, fibers and the like. The same can be said of the adhesion of the resin matrix to other materials.

SUMMARY AND OBJECT OF THE INVENTION

It is an object of the invention to further develop the method of the type mentioned at the outset for the manufacture of molding materials and the like from anionically polymerisable di or poly epoxy compounds in such a manner that molding materials are obtained in economically acceptable reaction times, with mechanical and thermal properties which, up to now, could not be attained by anionic polymerisation.

According to this invention, this object is achieved by the provision that the epoxy compounds, or their mixtures, are polymerised in one pass or in partial steps, with mixed catalysts of a tertiary amine of the general formula

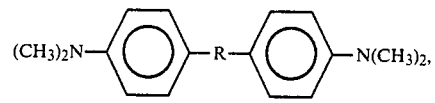

where R has the following meaning:
>CH$_2$, >CHOH; >CO, >CS, —O—, —S—, >SO$_2$,

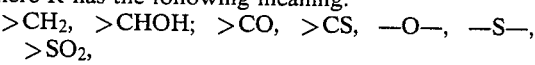

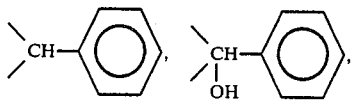

and an imidazole of the general formula

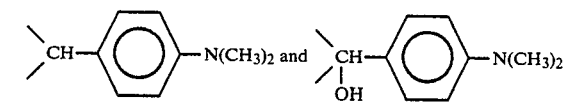

where
R$^1$= —H, —CH$_3$, —(CH$_2$)$_2$—CN, —CH=CH$_2$, —(CH$_2$)$_3$—NH$_2$—C$_6$H$_5$,
R$^2$= —H, —CH$_3$, —C$_2$H$_5$, —CH(CH$_3$)$_2$ and —C$_6$H$_5$,
R$^3$= —H or —CH$_3$ and
where R$^4$ means —H or —CH$_3$ and whereby R$^1$, R$^2$, R$^3$ and R$^4$, are not at the same time —H and R$^1$ and R$^2$ are not at the same time —C$_6$H$_5$. Fillers, fibers woven or non-woven fabrics may be added to the epoxy compounds.

The molding materials prepared in accordance with the method of this invention not only exhibit good hydrolysis stability but they also have a very low double-bond concentration and thus show increased chemical and thermal stability.

A further advantage of the method of this invention is that control of the cross-linking rate of the reaction resin compound via the ratio of the mixed catalyst components is possible as well as the selection of the mechanical and thermal properties of the product.

In the manufacture of molding materials, the method according to the invention also permits a distinct reduction of the mold occupation times without adverse effects on the mechanical and thermal properties of the molding materials. For instance, it is possible to obtain a reduction to one-tenth of the mold occupation time required without the addition of the imidazoles called for by the process of the present invention. A further positive result of this method turned out to be that, through the use of the mixed catalysts, polymerisate molding materials with heretofore impossible vitrification transition ranges are obtained, yet also with highly desirable mechanical properties.

DETAILED DESCRIPTION OF THE INVENTION

In the method according to the invention are used advantageously 0.05 to 10 mass parts of mixed catalyst per 100 mass parts of epoxy compound. Preferably, 0.1 to 5 mass parts of catalyst are used. The ratio of imidazole to tertiary amines in the mixed catalyst is advantageously between 0.01 and 0.6. Preferably, this ratio is between 0.02 and 0.4. The mixed catalysts which are the preferably used systems are 4.4'-bis(dimethylamino)-benzophenone/2-isopropylimidazole and 4.4'-bis(dimethylamino)benzhydrol/2-isopropylimidazol.

In the method according to the invention, the following epoxy compounds are useful:

Bisphenol-A-diglycidyl ether, bisphenol-F-diglycidyl ether, polyglycidyl ether of phenol/formaldehyde or cresol formaldehyde novolaks, hexahydrophtalic acid-diglycidyl esters, hydantoin epoxy resins, glycidyl isocyanurates such as triglycidylisocyanurate, and urazol epoxies. Epoxy resin mixtures are preferred, i.e., mixtures of two or more epoxy resins. To the epoxy compounds of the type mentioned above can also be added aliphatic compounds such as hydrogenated bisphenol-A and bisphenol-F-diglycidyl ethers.

Preferably, the method according to the invention is carried out as follows:

Bisphenol-A and/or bisphenol-F-diglycidyl ether is polymerised with 4 to 8 mass parts and preferably 7 mass parts of mixed catalyst with a imidazole/tertiary amine ratio of 0.2 to 0.4;

mixtures of bisphenol-A and/or bisphenol-F-diglycidyl ether with trifunctional hydantoin-epoxy resins in a mass ratio of 20:80 to 80:20, and preferably 50:50 are polymerised in the presence of 4 to 8 mass parts and preferably 7 mass parts of mixed catalyst with a imadazole/tertiary amine ratio of 0.2 to 0.4.

In the method according to the invention, the epoxy compounds are polymerised in one pass or in partial steps. Polymerisation in partial steps is understood here to be a procedure in which the transfer of the epoxy molding compounds into the molding materials, which takes place with heat being supplied, is carried out in several steps.

The molding materials produced in accordance with the method of the invention, which are electrically and mechanically of high quality, are particularly well suited as insulating parts in electrotechnology, for casting-resin type transformers and for the manufacture of switching rods (e.g. for $SF_6$ circuit breakers).

The invention will be explained in greater detail and with reference to the following examples.

Comparative tests have shown that, at a temperature of 120° C., Mannich bases or imidazoles initiate polymerisation faster than tertiary aromatic amines of the general formula

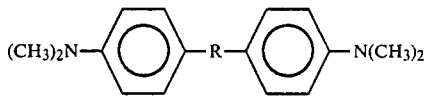

(with the meaning for R as given above). Table 1 shows this by the example of the gelling times.

4.4'-bis(dimethylamino)-benzophenone (Michler's ketone) and 4.4'-bis(dimethylamino)-diphenylcarbinol yield low polymerisation rates. However, molding materials so produced exhibit very good mechanical and electrical properties, as will be seen from Table 2.

TABLE 1

| Epoxy Resin | Catalyst | Catalyst Concentration mol % | Reaction Temperature °C. | Gelling Time Min. |
|---|---|---|---|---|
| Bisphenol-A-diglycidyl-ether (EZ = 0.58) | 1,2-Dimethyl-imidazol | 1.16 | 120 | 0.5 |
| Bisphenol-A-diglycidyl-ether (EZ = 0.58 | 2-Iso-propyl-imidazol | 1.10 | 120 | 120 |
| Bisphenol-A-diglycidyl-ether (EZ = 0.58) | N.N.—Di methylbenzyl-amine | 1. | 120 | 25 |
| Bisphenol-A-diglycidyl-ether (EZ = 0.58) | 4.4'-Bis (dimethyl-amino)-benzophenone | 2.0 | 120 | 1800 |

TABLE 2

| | Molding Material Data* | | | | | | | |
|---|---|---|---|---|---|---|---|---|
| | BF N/mm² | | SZ kJ/m² | | $T_M$ °C. | | Cross-Linking Conditions | |
| | (a) | (b) | (a) | (b) | (a) | (b) | Time h | Temp. C. |
| Bisphenol-F—diglycidyl ether Michlers Ketone, 65% $SiO_2$ | 148 | 125[1] | 13.5 | o.B.[2] | 95 | 85 | 16<br>16 | 120<br>160 |
| Bisphenol-A—diglycidyl ether Michlers Ketone, 65% $SiO_2$ | 135 | 121[1] | 13.4 | o.B.[2] | 105 | 92 | 16<br>16 | 120<br>160 |
| Bisphenol-F—diglycidyl ether/ trifunctional Hydantoin-epoxide (50:50) Michlers Ketone, 65% $SiO_2$ | 163 | 129 | 15.14 | 11.6 | 124 | 113 | 16<br>16 | 120<br>160 |

*BF = bending strength; SZ = impact strength; $T_M$ = Martens temperature
(a) with 65% quartz meal; (b) matrix
[1]bending stress limit;
[2]no fracture The cross-linking times required for the properties given in Table 2 (15 to 20 hours at 120° C. up to removability from the mold and post-anealing times of at least the same duration at elevated temperatures) are not practical. On the other hand, polymerisation with catalysts which cause higher reaction rates leads to molding materials (epoxy compound: bisphenol-A-diglycidyl ether; EZ=0.58) with insufficient mechanical properties, as is shown in Table 3.

TABLE 3

| Catalyst | Catalyst Concentration** Mol.-% | Molding Material Data* | | | | | | Gelling* In Minutes at °C. |
|---|---|---|---|---|---|---|---|---|
| | | BF N/mm² | | SZ kJ/m² | | T_M °C. | | |
| | | (a) | (b) | (a) | (b) | (a) | (b) | (b) |
| 1-Cyano-ethyl-2-ethyl-4-methyl-imidazol | 1,46 | 92 | 60 | 6.7 | 7.7 | 169 | 121 | 20  120 |
| 2-Isopropyl-imidazol | 1,46 | 93 | 49 | 7.3 | 7.5 | 146 | 117 | 60  120 |
| 1-Vinyl-imidazol | 1,46 | 34 | (—) | 3.3 | (—) | 98 | 74 | 118  120 |
| 1.2-Dimethyl-imidazol | 1,16 | (—) | (—) | (—) | (—) | (—) | (—) | 0.5  120 |
| 1.2-Dimethyl-imidazol | 1,10 | (—) | (—) | (—) | (—) | (—) | (—) | 22  120 |

*(a) 65% quartz meal
(b) matrix
**relative to the epoxy compound used
(—) specimen too brittle, not measurable In comparison thereto, the properties of molding materials produced by the method according to the invention are given in Table 4 (the values given are in relation to the matrix). The examples in Table 4 are based on the following sysem (MT=mass parts):

50 MT bisphenol-F-diglycidyl ether (EZ=0.58), 50 MT trifunctional epoxy resin with a hydantoin base (EZ=0.57; Arldit ®XB 3085 of Ciba-Geigy AG Basle), 5 MT 4.4′-bis(dimethylamino)-benzophenone and x MT 2-isopropylimidazol (see Table 4).

TABLE 4

| 2-Isopropyl-imidazol Mass Parts | Molding Material Data | | | Mold Occupation Time h | Mold Temperature °C. | Post Anneal | |
|---|---|---|---|---|---|---|---|
| | BF N/mm² | SZ kJ/m² | T_M °C. | | | h | °C. |
| 0 | 129.4 | 11.6 | 113 | 16 | 120 | 24 | 160 |
| 1 | 113.9 | 12.1 | 115 | 1.6 | 120 | 24 | 160 |
| 1.5 | 100.0 | 13.0 | 118 | 1.5 | 120 | 24 | 160 |
| 2 | 90.4 | 10.8 | 129 | 1.5 | 120 | 24 | 160 |

What is claimed is:

1. A method for the manufacture of molding materials from polymerisable di- or poly-epoxy compounds comprising laminates, stratified materials and covers or protective layers comprising mixing epoxy resin components and; catalyzing the polymerization of epoxy resin components with mixed catalysts comprising a tertiary amine of the formula:

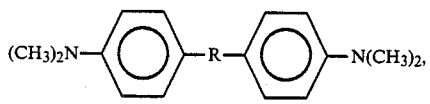

where R has the following meaning:
>CH₂, >CHOH, >CO, >CS, —O—, —S—, >SO₂,

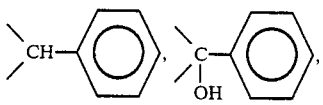

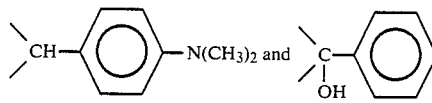

and an imidazole of the formula:

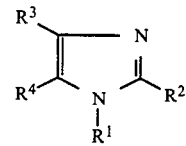

where
$R^1$ = —H, —CH$_3$, —(CH$_2$)$_2$—CN, —CH=CH$_2$, —(CH$_2$)$_3$—NH$_2$ or —C$_6$H$_5$,
$R^2$ = —H, —CH$_3$, —C$_2$H$_5$, —CH(CH$_3$)$_2$ or —C$_6$H$_5$,
$R^3$ = —H or —CH$_3$ and
$R^4$ = —H or —CH$_3$
whereby $R^1$, $R^2$, $R^3$ and $R^4$ are not at the same time —H and $R^1$ and $R^2$ are not at the same time —C$_6$H$_5$.

2. The method according to claim 1 wherein from 0.05 to 10.0 mass parts of mixed catalyst are used per 100 mass parts of epoxy resin compound.

3. The method according to claim 1 wherein from 0.1 to 5.0 mass parts of mixed catalyst per 100 mass parts of epoxy compound are used.

4. The method according to claims 1, 2 or 3 wherein the mass ratio of the imidazole to the tertiary amine is from about 0.01 to about 0.6.

5. The method of claim 4 wherein said mass ratio is from about 0.02 to about 0.4.

6. The method of claim 1 wherein the epoxy compounds comprise at least one member selected from the group consisting of bisphenol-A-diglycidyl ether and bisphenol-F-diglycidyl ether and are polymerized in the presence of from about 4 to about 8 mass parts of mixed catalyst 100 parts of epoxy compound and wherein the ratio of imidazole to tertiary amine is from about 0.2 to about 0.4.

7. The method of claim 6 wherein 7 mass parts of mixed catalyst are used.

8. The method of claim 2 wherein mixtures of trifunctional hydantoin epoxy resins are polymerized and at least one member selected from the group of bisphenol-A-diglycidyl ether and bisphenol-F-diglycidyl ether in a mass ratio of from about 80:20 to about 20:80 are polymerized in the presence of from about 4 to about 8 mass parts of mixed catalyst per 100 parts of epoxy compound and wherein the ratio of imidazole to tertiary amine is from about 0.2 to about 0.4.

9. The method of claim 8 wherein the mass ratio of trifunctional hydantoin epoxy resin to diglycidyl ether is about 1 and wherein about 7 mass parts of mixed catalyst are used.

10. The product of the method according to claims 1, 2, 3, 6, 8 or 9.

11. The product of the method according to claim 4.

12. The product of the method according to claim 5.

13. The product of the method according to claim 7.

14. The method according to claim 1 wherein the mixed catalyst comprises 4,4'-bis(dimethylamino)-benzophenone and 2-isopropylimidazolee.

15. The method according to claim 1 wherein the mixed catalyst comprises 4.4'-bis(dimethylamino)-benzhydrol and 2-isopropylimidazole.

16. The method according to claim 1 wherein fillers, fibers, woven or non-woven fabrics are added to the epoxy compounds.

* * * * *